(12) United States Patent
Tsao

(10) Patent No.: US 8,973,085 B2
(45) Date of Patent: Mar. 3, 2015

(54) DESCRAMBLING APPARATUS AND TELEVISION SYSTEM UTILIZING THE SAME

(71) Applicant: MStar Semiconductor, Inc., Hsinchu Hsien (TW)

(72) Inventor: Ting-Pang Tsao, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 13/966,501

(22) Filed: Aug. 14, 2013

(65) Prior Publication Data
US 2014/0082656 A1  Mar. 20, 2014

(30) Foreign Application Priority Data

Sep. 18, 2012  (TW) .............................. 101134078 A

(51) Int. Cl.
*H04N 7/16* (2011.01)
*H04N 21/258* (2011.01)
*H04N 21/2389* (2011.01)
*H04N 21/4385* (2011.01)
*H04L 9/14* (2006.01)

(52) U.S. Cl.
CPC ... *H04N 21/25875* (2013.01); *H04N 21/23895* (2013.01); *H04N 21/43853* (2013.01); *H04L 9/14* (2013.01)
USPC ............................................ 725/151; 725/25

(58) Field of Classification Search
CPC .......... H04L 9/10; H04L 9/12; H04N 1/4486; H04N 21/4181; H04N 21/42623
See application file for complete search history.

(56) References Cited

U.S. PATENT DOCUMENTS 6,356,637 B1 * 3/2002 Garnett .......................... 380/265
2011/0083141 A1 * 4/2011 Westberg et al. ............... 725/31

* cited by examiner

*Primary Examiner* — Dominic D Saltarelli
(74) *Attorney, Agent, or Firm* — Edell, Shapiro & Finnan, LLC

(57) ABSTRACT

A descrambling apparatus includes a descrambling module and a one-time programmable module. The descrambling module descrambles an input data stream. When the one-time programmable module is in a first status, the descrambling module descrambles the input data stream by a first mode. When the one-time programmable module is in a second status, the descrambling module descrambles the input data stream by a second mode.

10 Claims, 1 Drawing Sheet

US 8,973,085 B2

DESCRAMBLING APPARATUS AND TELEVISION SYSTEM UTILIZING THE SAME

This application claims the benefit of Taiwan application Serial No. 101134078, filed Sep. 18, 2012, the subject matter of which is incorporated herein by reference.

BACKGROUND OF THE INVENTION

1. Field of the Invention

The invention relates to a descrambling technique.

2. Description of the Related Art

To protect ownership rights and interests, television program providers usually scramble contents of pay-television programs, and provide only critical information required for a descrambling procedure to paid subscribers. Television program providers of different regions may employ scrambling mechanisms in different types and different levels. A currently prevalent Digital Video Broadcasting Common Scrambling Algorithm (DVB-CSA) specifies that a header of each image block needs to include two bits for indicating whether image contents carried in the image block are scrambled and for describing a key for descrambling.

To reinforce a protection level, television providers in certain regions scramble image blocks by alternatively utilizing several keys. For example, for a same video stream, the first one hundred image blocks are descrambled by a first key, the next one hundred image blocks are descrambled by a second key, the next one hundred image blocks are descrambled by the first key, and so forth. The television program providers then in advance provide the first key and the second key (which may be stored into a memory at a reception end) to a user. When descrambling at the reception end, the correct key is selected for descrambling according to the header contents of the image blocks.

To reduce production costs and inventory management complications, rather than manufacturing different chips for two different regions, a manufacturer of descrambling chips sometimes sells the same type of chips to two regions adopting different scrambling mechanisms. For example, it may be the case that a television program provider in a region A adopts a scrambling solution of utilizing one key, whereas a television program provider B adopts a scrambling solution of alternately utilizing two keys. A descrambling chip may be correspondingly designed to be capable of descrambling by alternately utilizing the two keys (for meeting requirements of region B), and descrambling by utilizing only one key with a part of the function (for meeting requirements of region A) turned off.

Current chip manufacturers mostly configure a descrambling mechanism of chips through software means according to a shipping destination of the chips. For example, part of the functionality is turned off for the descrambling chips to be sold to region A. Based on market considerations, a selling price of the descrambling chips sold to region A may be lower than the selling price of the same chip to region B. However, once the software for setting the descrambling mode in the chips is cracked or modified (e.g., the functions originally turned off by the chip manufacturer are turned on), it is possible that the descrambling chips intended to be sold to region A may be transported to and utilized in region B, thus causing considerable economic loss of the chip manufacturer.

SUMMARY OF THE INVENTION

The invention is directed to a descrambling apparatus and a television system utilizing the descrambling apparatus. With a one-time programmable e-fuse that is subsequently non-modifiable or a one-time programmable read-only memory (OTP-ROM), the descrambling apparatus effectively eliminates the issue of malicious modifications on the foregoing chips after the chips are shipped out of the factory.

According to an embodiment of the present invention, a descrambling apparatus is provided. The descrambling apparatus comprises a descrambling module for descrambling an input data stream, and a one-time programmable module. When the one-time programmable module is in a first status, the descrambling module descrambles the input data stream by a first mode. When the one-time programmable module is in a second status different from the first status, the descrambling module descrambles the input data stream by a second mode.

According to another embodiment of the present invention, a television system is provided. The television system comprises a descrambling module, a one-time programmable module and a broadcast module. The descrambling module descrambles an input video stream to generate an output video stream. When the one-time programmable module is in a first status, the descrambling module descrambles the input video stream by a first mode. When the one-time programmable module is in a second status different from the first status, the descrambling module descrambles the input video stream by a second mode. The broadcast module broadcasts an image generated according to the output video stream.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
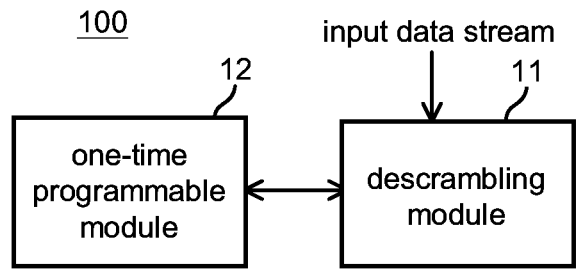
FIG. 1 is a block diagram of a descrambling apparatus according to an embodiment of the present invention.

FIG. 1 shows a block diagram of a descrambling apparatus 100 according to an embodiment of the present invention. The descrambling apparatus 100 comprises a descrambling module 11 and a one-time programmable module 12. In practice, the descrambling apparatus 100 may be integrated into an electronic apparatus with descrambling requirements (e.g., a television system or a television set-up box), or may be an independent device. Descrambling apparatus 100 may be implemented in the form of e.g., an application specific integrated circuit (ASIC) among other possible hardware implementations.

The descrambling module 11, having a plurality of descrambling modes, descrambles an input data stream and determines a mode for descrambling the input data stream according to a status of the one-time programmable module 12. For example, according to the status of the one-time programmable module 12, the descrambling module 11 determines whether to perform a descrambling procedure, an acceptable number of keys, the key to be adopted in the descrambling procedure, or the descrambling algorithm to be adopted. It should be noted that, the one-time programmable module 12 may be designed with many possible statuses. In the embodiment below, an example of the one-time programmable module 12 having two statuses (a first status and a second status) is given. When the one-time programmable module 12 is in the first status, the descrambling module 11 descrambled the input data stream by a first mode. When the one-time programmable module 12 is in the second status, the descrambling module 11 descrambles the input data stream by a second mode.

In practice, the one-time programmable module 12 may comprise an e-fuse. When the e-fuse is conducted (i.e., is not "blown" or remains in a conductive state), the one-time programmable module 12 is in the first status. When the e-fuse is disconnected (i.e., "blown"), the one-time programmable module 12 is in the second status. Alternatively, the one-time programmable module 12 may comprise a one-time programmable read-only memory (OTP-ROM). When a descrambling region in the OTP-ROM carries a first content (e.g., a value A), the one-time programmable module is in the first state. When the descrambling region carries a second content different from the first content (e.g., a value B different from the value A), the one-time programmable module is in the second status.

According to actual requirements (e.g., a descrambling mechanism adopted by a shipping destination), a manufacturer of the descrambling apparatus 100 may determine whether to set the one-time programmable module 12 to the first status or the second status. When the one-time programmable module 12 comprises an e-fuse, the manufacturer may select the status of the one-time programmable module 12 through burning and melting the e-fuse or keeping the e-fuse. When the one-time programmable module 12 comprises an OTP-ROM, the manufacturer may select the status of the one-time programmable module 12 by writing different contents into the descrambling region therein.

Figure 2:
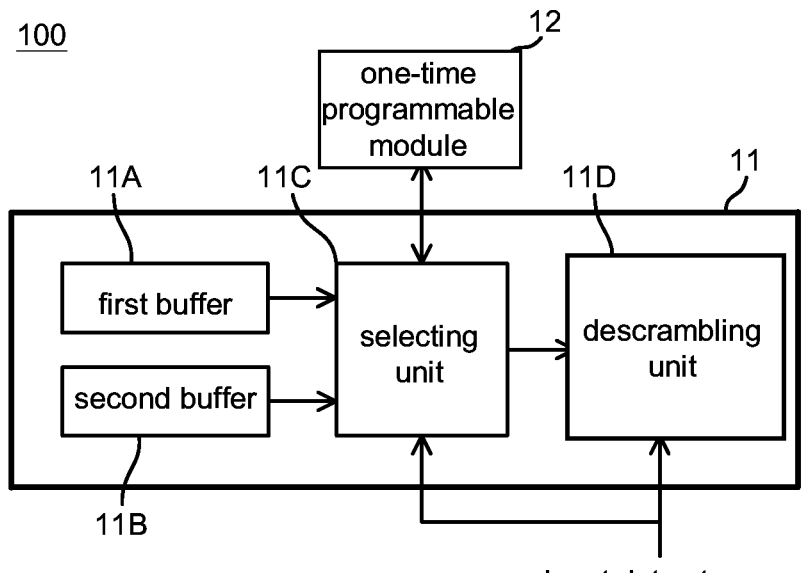
FIG. 2 is a block diagram of a descrambling module according to an embodiment of the present invention.

FIG. 2 shows a block diagram of the descrambling module 11 according to an embodiment of the present invention. In the embodiment, the descrambling module 11 comprises a first buffer 11A, a second buffer 11B, a selecting unit 11O and a descrambling unit 11D. The first buffer 11A stores a first key, and the second buffer 11B stores a second key. The input data stream comprises a plurality of blocks, each of which comprises a header corresponding to the first key or the second key. When the header of a block corresponds to the first key, it means that the block is to be descrambled by the first key; when the header of a block corresponds to the second key, it means that the block is to be descrambled by the second key.

The selecting unit 11C determines whether to retrieve the first key from the first buffer 11A or the second key from the second buffer 11B according to the status of the one-time programmable module 12 and the header of each block to generate a selection result to be provided to the descrambling unit 11D. The descrambling unit 11D descrambles the input data stream according to the selection result. When the selecting unit 11C determines that the one-time programmable unit 12 is in the first status (e.g., when the e-fuse is conducted), the selecting unit 11C retrieves the corresponding first key or second key as the selection result according to the header of each block. In contrast, when the selecting unit 11C determines that the one-time programmable module 12 is in the second status (e.g., when the e-fuse is melted or disconnected or blown), the selecting unit 11C consistently retrieves only the first key as the selection result, or provides a predetermined signal as the selection result.

In continuation of the above description, if the manufacturer intends to sell the descrambling apparatus 100 to a region where the input data stream is descrambled by alternately utilizing two keys, the one-time programmable module 12 may be set to the first status before shipping the descrambling apparatus 100 out of the factory, such that the selecting unit 11O maintains the function of selecting the key according to headers of blocks. If the manufacturer intends to sell the descrambling apparatus 100 to a region where the input data stream is descrambled by utilizing one key, the one-time programmable module 12 may be set to the second status before shipping the descrambling apparatus 100 out of the factory, such that the selecting unit 11C is configured to consistently retrieve only the first key as the selection result. Alternatively, if the manufacturer intends to sell the descrambling apparatus 100 to a region where an input data stream is not scrambled at all, the one-time programmable module 12 may be set to the second status before shipping the descrambling apparatus 100 out of the factory, such that the selecting unit 11C is configured to provide a disable signal to prompt the descrambling unit 11D to suspend the descrambling procedure.

In the above embodiment, the number of keys acceptable to the descrambling unit 11D may be changed through setting the status of the one-time programmable module 12. More generally, the descrambling module 11 may be set to descramble the input data stream according to an N number of keys in the first mode, and to descramble the input data stream according to an M number of keys in the second mode, where N and M are natural numbers and N is not equal to M. In an alternative embodiment, the multiple statuses of the one-time programmable module 12 may be designed to correspond to different keys or to different descrambling algorithms.

An e-fuse is unlikely to be reconnected or re-conducted after being melted or blown. Similarly, an OTP-ROM cannot be erased and rewritten after being edited once. In an embodiment of the present invention, a main characteristic of the one-time programmable module as the status of the one-time programmable module being subsequently non-modifiable is fully exercised, i.e., the status of the one-time programmable module is irreversible after being configured for the first time. Taking the descrambling apparatus 100 shown in FIG. 2 for example, once being set to the second status, the one-time programmable module 12 cannot be restored to the first status. Compared to configuration software that is more easily cracked or hacked, a manufacturer of the descrambling apparatus 100 can more effectively prevent the issue of transporting and selling a chip sold at a lower price in one region to a region where another chip is sold at a higher price.

Figure 3:
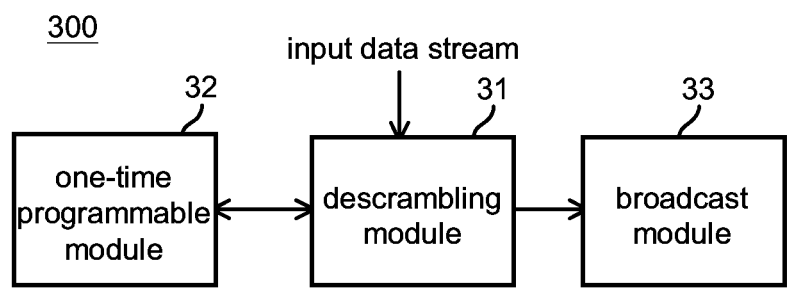
FIG. 3 is a block diagram of a television system according to an embodiment of the present invention.

FIG. 3 shows a television system 300 according to another embodiment of the present invention. The television system 300 comprises a descrambling module 31, a one-time programmable module 32 and a broadcast module 33. The descrambling module 31 descrambles an input video stream to generate an output video stream. When the one-time programmable module 32 is in a first status, the descrambling module 31 descrambles the input video stream by a first mode. When the one-time programmable module 32 is in a second status different from the first status, the descrambling module 31 descrambles the input video stream by a second mode. The broadcast module 33 broadcasts an image generated according to the output video stream.

Details and variations described when illustrating the descrambling apparatus 100 (e.g., implementation details of the one-time programmable module and the descrambling module) are applicable to the television system 300 in FIG. 3, and shall be omitted herein.

As in the above embodiments, a descrambling apparatus and a television system utilizing the descrambling system of the present invention are disclosed. With a one-time programmable e-fuse that is subsequently non-modifiable or an OTP- ROM, the descrambling apparatus effectively eliminates the issue of malicious modifications on the foregoing chips after the chips are shipped out of the factory.

While the invention has been described by way of example and in terms of the preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A descrambling apparatus, comprising:
a descrambling module configured to descramble an input data stream; and
a one-time programmable module that is configured to cause the descrambling module to descramble the input data stream by a first mode when the one-time programmable module is in a first status, and to descramble the input data stream by a second mode when the one-time programmable module is in a second status different from the first status,
wherein the first mode employs a plurality of separate keys and the second mode employs a single key, and
wherein the descrambling module is configured to receive and store the plurality of keys or the single key after the one-time programmable module is set according to the first status or the second status.

2. The descrambling apparatus according to claim 1, wherein the one-time programmable module is an e-fuse; the one-time programmable module is in the first status when the e-fuse is conducted, and is in the second status when the e-fuse is disconnected.

3. The descrambling apparatus according to claim 1, wherein the one-time programmable module is a one-time programmable read-only memory (OTP-ROM); the OPT-ROM is in the first status when a descrambling region in the OTP-ROM carries a first content, and is in the second status when the descrambling region carries a second content different from the first content.

4. The descrambling apparatus according to claim 1, wherein the descrambling module descrambles the input data stream in the first mode according to an N number of keys, and descrambles the input data stream in the second mode according to an M number of keys, where N and M are natural numbers and N is not equal to M.

5. The descrambling apparatus according to claim 1, wherein the input data stream comprises a plurality of blocks each comprising a header corresponding to a first key or a second key; the descrambling module comprises:
a first buffer, storing the first key;
a second buffer, storing the second key;
a selecting unit that determines whether to retrieve the first key from the first buffer or the second key from the second buffer as a selection result according to the first status or the second status of the one-time programmable module; and
a descrambling unit, for descrambling the input data stream according to the selection result;
wherein, when it is determined that the one-time programmable module is in the first status, the selecting unit retrieves the first key or second key as the selection result corresponding to the header; when it is determined that the one-time programmable module is in the second status, the selecting unit retrieves the first key or provides a predetermined signal as the selection result.

6. A television system, comprising:
a descrambling module configured to descramble an input video stream to generate an output video stream;
a one-time programmable module that is configured to cause the descrambling module to descramble the input video stream by a first mode when the one-time programmable module is in a first status, and to descramble the input video stream by a second mode when the one-time programmable module is in a second status different from the first status; and
a broadcast module, for broadcasting an image generated according to the output video stream,
wherein the first mode employs a plurality of separate keys and the second mode employs a single key, and
wherein the descrambling module is configured to receive and store the plurality of keys or the single key after the one-time programmable module is set according to the first status or the second status.

7. The television system according to claim 6, wherein the one-time programmable module comprises an e-fuse, the one-time programmable module is in the first status when the e-fuse is conducted, and is in the second status when the e-fuse is disconnected.

8. The television system according to claim 6, wherein the one-time programmable module comprises an OTP-ROM, the OPT-ROM is in the first status when a descrambling region in the OTP-ROM carries a first content, and is in the second status when the descrambling region carries a second content different from the first content.

9. The television system according to claim 6, wherein the descrambling module descrambles the input video stream in the first mode according to an N number of keys, and descrambles the input video stream in the second mode according to an M number of keys, where N and M are natural numbers and N is not equal to M.

10. The television system according to claim 6, wherein the input video stream comprises a plurality of image blocks each comprising a header corresponding to a first key or a second key; the descrambling module comprises:
a first buffer, storing the first key;
a second buffer, storing the second key;
a selecting unit, for determining whether to retrieve the first key from the first buffer or the second key from the second buffer as a selection result according to the first status or the second status of the one-time programmable module; and
a descrambling unit, for descrambling the input video stream according to the selection result;
wherein, when it is determined that the one-time programmable module is in the first status, the selecting unit retrieves the first key or second key as the selection result corresponding to the header; when it is determined that the one-time programmable module is in the second status, the selecting unit retrieves the first key or provides a predetermined signal as the selection result.

* * * * *